(12) United States Patent
Baluha

(10) Patent No.: US 9,252,612 B2
(45) Date of Patent: Feb. 2, 2016

(54) PERSONAL MOBILE CHARGING DEVICE

(76) Inventor: Mark Regan Baluha, Saginaw, MI (US)

( * ) Notice: Subject to any disclaimer, the term of this patent is extended or adjusted under 35 U.S.C. 154(b) by 675 days.

(21) Appl. No.: 13/437,714

(22) Filed: Apr. 2, 2012

(65) Prior Publication Data

US 2013/0257348 A1 Oct. 3, 2013

(51) Int. Cl.
*H02J 7/00* (2006.01)

(52) U.S. Cl.
CPC ............. *H02J 7/0044* (2013.01); *H02J 7/0055* (2013.01)

(58) Field of Classification Search
CPC ....................................................... Y02E 60/12
USPC ....................................................... 320/107
See application file for complete search history.

(56) References Cited

U.S. PATENT DOCUMENTS

| | | | |
|---|---|---|---|
| 596,849 A | 1/1898 | Combier | |
| 1,331,457 A | 2/1920 | Elliott | |
| 1,345,917 A | 7/1920 | Fitzgerald | |
| 2,304,367 A | 12/1942 | Meyer | |
| 2,681,453 A | 6/1954 | Lane | |
| 3,374,636 A | 3/1968 | Mason | |
| 3,919,615 A | 11/1975 | Niecke | |
| D278,386 S | 4/1985 | Share | |
| 4,523,258 A | 6/1985 | Morse et al. | |
| D279,424 S | 7/1985 | Leiserson | |
| 4,923,105 A | 5/1990 | Snyder | |
| D308,910 S | 7/1990 | Chang | |
| 5,194,857 A * | 3/1993 | Gomez | 340/7.63 |
| 5,395,023 A | 3/1995 | Naymark | |
| 5,630,536 A | 5/1997 | Bugnaski | |
| 5,680,026 A | 10/1997 | Lueschen | |
| D423,449 S | 4/2000 | Naskali | |
| 6,260,978 B1 | 7/2001 | St. John | |
| 6,528,203 B1 * | 3/2003 | Mitamura | 429/98 |
| 6,899,257 B2 | 5/2005 | Jones | |
| D509,182 S | 9/2005 | Takeshita | |
| D548,178 S | 8/2007 | Suk | |
| 7,558,622 B2 | 7/2009 | Tran | |
| D647,279 S | 10/2011 | Shi et al. | |
| 8,035,560 B1 * | 10/2011 | Glodz et al. | 342/357.71 |

(Continued)

FOREIGN PATENT DOCUMENTS

| | | |
|---|---|---|
| CN | 201189233 (Y) | 2/2009 |
| JP | 2003306819 (A) | 10/2003 |
| WO | WO 2011/049859 A1 | 4/2011 |

OTHER PUBLICATIONS

PCT Int'l App. No. PCT/US2013/034892 filed Apr. 2, 2013 (Priority Apr. 2, 2012) Jul. 3, 2013—International Search Report and Written Opinion.

(Continued)

*Primary Examiner* — Yalkew Fantu
(74) *Attorney, Agent, or Firm* — Reising Ethington PC

(57) ABSTRACT

An improved personal mobile charging device for providing back up electrical charging or standby power for personal electronic devices comprising an elongate rectangular body having a top, a bottom, two elongate sides and two short sides typically made of leather and having thin flexible lengths of material representing an outside surface (2) and an inside surface (4) creating a space for the permanent placement of at least one battery (8) protected by a circuit (12) with integrated plug (14) that regulates over and under charging and discharge of power to connected personal electronic device wherein the embodiment can be perceived as ones primary fashion belt or strap.

11 Claims, 2 Drawing Sheets

(56) References Cited

U.S. PATENT DOCUMENTS

| | | |
|---|---|---|
| D648,270 S | 11/2011 | Jiang |
| D650,737 S | 12/2011 | Hamilton |
| 8,072,183 B2 | 12/2011 | Griffin, Jr. |
| 8,186,021 B2 * | 5/2012 | Gonzalez .................. 24/3.1 |
| 8,626,297 B2 | 1/2014 | Jaax et al. |
| 2007/0056779 A1 * | 3/2007 | Laniado et al. ............ 177/245 |
| 2007/0276270 A1 | 11/2007 | Tran |
| 2008/0277441 A1 | 11/2008 | Zimmermann |
| 2009/0082835 A1 | 3/2009 | Jaax et al. |
| 2009/0109633 A1 | 4/2009 | Rajala et al. |
| 2009/0224722 A1 | 9/2009 | Causey |
| 2010/0114143 A1 | 5/2010 | Albrecht et al. |
| 2011/0128726 A1 | 6/2011 | Moreshead |

OTHER PUBLICATIONS

European Patent Office—EPO App. No. 13772982.8.-1804/1833755 filed Apr. 2, 2013; Supplemental/Extended Search Report dated Oct. 15, 2015.

* cited by examiner

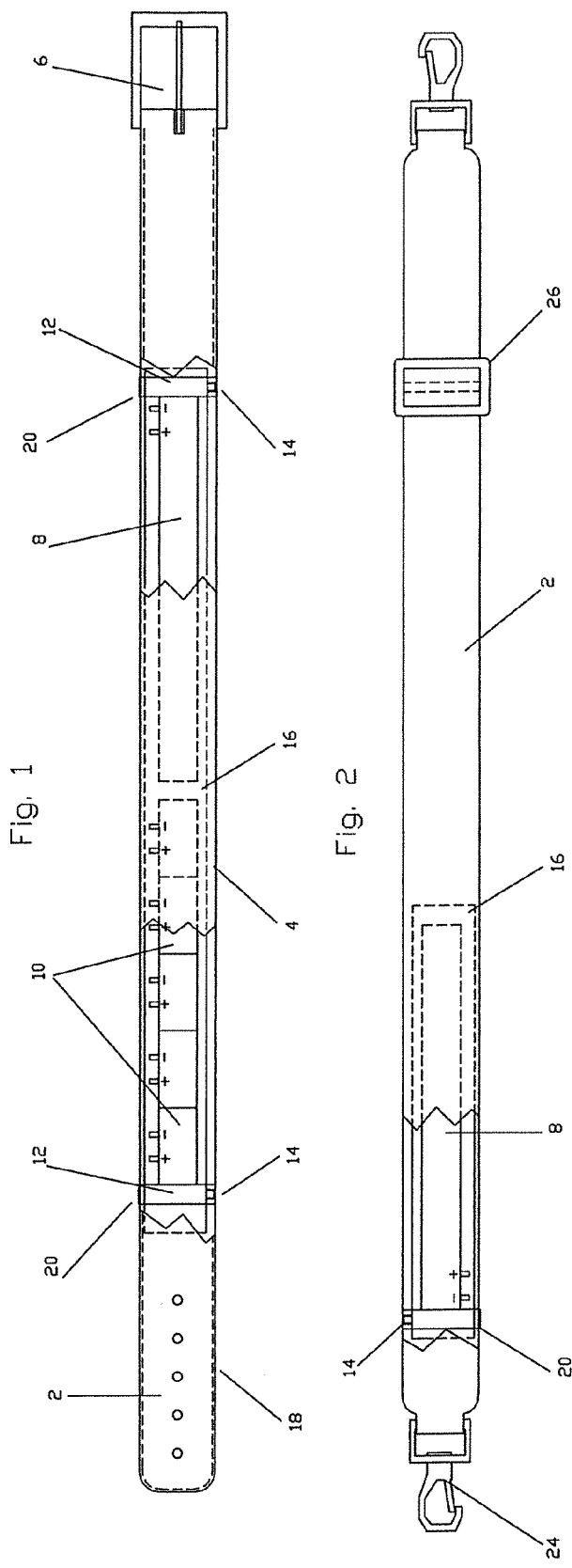

PERSONAL MOBILE CHARGING DEVICE

FIELD OF THE INVENTION

This invention relates to the design and application of an improved personal mobile charging device and more specifically to the design and ability of the device to contain and provide a backup charge and/or standby power for personal electronic devices integrated inside the internal area of a fashion belt or strap.

BACKGROUND

A multitude of standby or backup charging apparatus for personal electronic devices are known. Typically, these charging devices provide standby or backup power for small personal electronic devices such as cameras, mobile phones, mp3 players, tablets, etc. Most of these backup or standby batteries are a size and shape that one must carry in a pocket, purse or case in addition to one's personal items. A majority of backup or standby batteries incorporate a single small battery pack or only offer a single charge. Most common embodiments of the rechargeable personal electronic device battery are relatively small rectangular blocks that are of specific shapes or designs that tend to be proprietary to the specific manufacturer of a said electronic device, with particular slots, notches, etc. to attach to a specific device.

Naskali U.S. Pat. No. D423,449, Takashita et al. U.S. Pat. No. D509182 and Griffin Jr. U.S. Pat. No. 8,072,183, disclose examples of battery design intended to be integrated into or used for a specific device. Designs for backup and/or standby batteries tend to mirror the specific battery design, as is shown us by Suk et al. U.S. Pat. No. D548,178, Jiang U.S. Pat. No. D648,270, and Hamilton U.S. Pat. No. D650,737 by the relatively small rectangular block that while provides standby or backup power also requires it to be a additional item carried in one's pocket or bag. These devices are normally compact in size and they are typically a standalone device that must be carried or packed away in one's purse or case for later use. The normal size and shape of these batteries are related to how one must carry or pack these devices and typically they use as little space or surface area possible thus limiting their overall charging or backup power ability and more importantly these devices are a size and shape and a separate container that one must carry individually in a pocket or case.

There is a multitude of and varied selections of styles, shapes and sizes of fashion belts or straps used to hold up ones garments or carry or support bags, purses, backpacks, etc.

The present disclosure generally pertains to the integration of one or more flexible, rechargeable and very thin standby or backup batteries into the internal structure or area of a fashion strap or belt worn by men or women as an accessory to their clothes, a support for trouser position around one's waist, a means of support for carrying holsters or pouches for tools, personal electronic devices, etc., a strap of a purse, briefcase or backpack. The integration of a standby or backup battery into the inner area of the fashion belt or strap allows for a larger surface area than a typical backup battery, circling one's body or use in a carry strap for purses, cases or backpacks and in a width and depth that would provide for a larger battery area or a multitude of batteries and subsequent charge in a convenient and relatively light weight carrying case.

Fashion or utility belts and straps have been in use for many years and encompass various shapes, as illustrated by Combier in U.S. Pat. No. 596,849, Elliott in U.S. Pat. No. 1,331,457, Lane in U.S. Pat. No. 2,681,453 or Fitzgerald in U.S. Pat. No. 1,345,917.

It is known that modern personal electronic devices when used regularly require recharging or additional charge during the course of the day. It is necessary for one to carry one's home or AC charging device when traveling or away from the office or home where charging can be easily achieved. It is during travel, times away, or periods of extended use of our personal electronic devices that the batteries can be expended and a recharging or backup power is needed.

It is typical in airports for travelers to search for an electrical outlet to recharge the batteries of electrical equipment such as mp3 player, cell phone, computer, etc.

Meyer et al. in U.S. Pat. No. 2,304,367, Niecke in U.S. Pat. No. 3,919,615, Share in U.S. Pat. No. D278,386, Leiserson et al. in U.S. Pat. No. D279,424 and Lueschen in U.S. Pat. No. 5,680,026 have shown us that a battery belt can be used for powering lights and other devices but as we can see, their designs, while they are perhaps innovative, are heavy, bulky and definitely not convenient to wear or designed to be worn as a primary belt or strap.

Mason in U.S. Pat. No. 3,374,636 shows us the internal integration of shot or weight in his belt/strap design. In an embodiment, the invention relates to a combination and internal integration of one or more very thin and flexible lithium polymer or similar compact battery designs, permanently incorporated inside the body or housing of a fashion belt or primary belt/strap. The belt or strap may utilize modern thin and flexible battery technology to provide backup or standby power for personal electronic devices or any other electric device that could utilize an integrated plug for conveying an electrical charge.

The rechargeable batteries inside the belt or strap preferably use known charging technology so the user can plug the belt or strap in to normal household power to charge the internal battery or batteries. Once the batteries are fully charged they will be readily available for use utilizing a small plug, using current known micro-usb, mini-usb or similar known adaptors, located on the belt in an obscure or hidden area for transferring or maintaining the electrical charge to one's device when and where needed, conveniently and discreetly, any time or place. Chang in U.S. Pat. No. D308,910 discloses a very basic belt view and Naymark et al. in U.S. Pat. No. 5,395,023 and Bugnaski in U.S. Pat. No. 5,630,536 show devices using straps or belts with pouches or pockets for carrying batteries or other devices. Lueschen in U.S. Pat. No. 5,680,026 shows a device that incorporates a battery pouch or compartment attached to a belt, as does St. John in U.S. Pat. No. 6,260,978. The inventions all place or attach their devices to the outer surface on the belt or strap, with the exception of Shi et al in U.S. Pat. No. D647,279, who imbeds a pocket on the inner surface of the belt for removal for battery storage, thus just another pouch or pocket. These designs require that the attached devices be removed from the belt or strap before the said belt or strap could be inserted into the trouser or garment loops for use as a primary garment or trouser support or fashion accessory. If these devices cannot be removed from the belt or strap then the device would be worn as an additional item over the top of one's primary garments or fashion accessories. In an embodiment, this invention utilizes the internal space inside the belt or strap to create the permanent compartment for the battery thus eliminating the need to carry an additional battery in a pouch or pocket or freeing said pouch or pocket for other items or devices. The device may also become the wearer's fashionable primary trouser or garment support or fashionable primary strap for purse or case.

SUMMARY OF THE INVENTION

According to an embodiment in a mobile charging device there is provided a thin flexible device acting as a personal mobile charging device comprising an elongate rectangular body having a top, a bottom, two elongate sides and two short sides. The body includes thin flexible lengths of material representing an outside and an inside surface or housing of the two elongate sides with a buckle or clip fixed on one end and a buckle attachment or clip on the opposing end of the length. The flexible lengths outside surface and inside surface are laminated or fixed together in a manner that creates a pocket or space for the permanent placement of at least one flexible battery. The device further comprises an integrated plug enabling the charging of the at least one battery and transfer of charge to a personal electronic device. The device further comprises a protective circuit coupled with the at least one battery that protects the at least one battery from over or under charging and regulates charge to an attached personal electronic device.

Accordingly an embodiment provides an improved personal mobile charging device proposed which is perceived as a primary fashion or utility belt or strap, wherein integrated into the internal area are thin flexible batteries, a protective circuit board, battery charge indicator, battery shielding and integrated plug for charging internal batteries and transferring the charge to personal electronic devices. The belt/strap would be created be laminating, sewing or otherwise bonding two lengths of material, i.e. leather, polymer, etc. of a length and width together so that an internal area is available for location of the thin, flexible batteries, protective circuit board an plug to be mounted and permanently sealed. The thin flexible Lithium polymer or similar battery or batteries would extend a length and width of the belt or strap to maximize battery surface area and charge capacity maintaining the belt or strap's primary garment support function, fitting trousers loops, strap for purse, etc. while minimizing and distributing weight.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 1 shows a view of typical fashion belt design with a buckle design on one end and punched holes for the buckle on the other end. The thin flexible battery or batteries are shown integrated between the inside and outside layers of the belt with a protective shielding for the battery and user and the protective circuit board with integrated plug and battery status indicator;

FIG. 2 shows a view of typical adjustable strap design with attachments for purse or case and the thin flexible batteries integrated into the internal area of the strap as well as the shielding, protective circuit board, integrated battery charge indicator and charge plug assembly;

REFERENCE NUMERALS IN DRAWINGS

Figure 3:
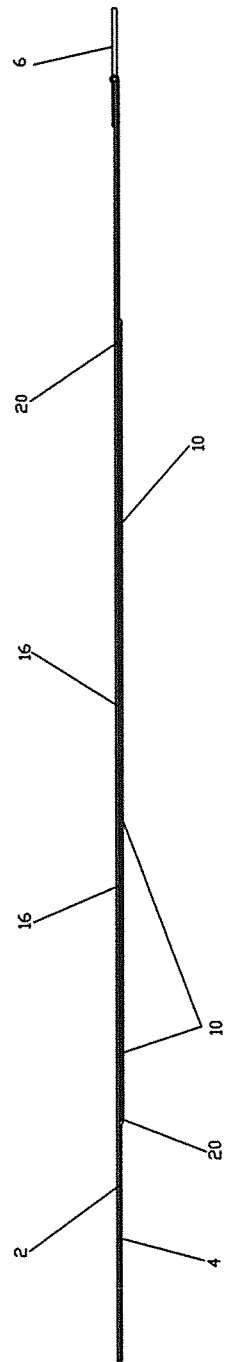
FIG. 3 shows a side view of an embodiment of the invention and the inside and outside laminations creating the internal pocket for the thin flexible battery assembly and shielding.

2 Outside surface of lamination length
4 Inside surface of lamination length
6 belt buckle design
8 long thin flexible battery
10 multiple short thin flexible batteries
12 protective circuit board
14 integrated charging plug
16 protective shielding for battery and user
18 laminating process, gluing, sewing etc. for the outside and inside laminations
20 battery charge indicator
24 attachment clip for purse or case
26 clip design for adjustable belt or strap

DETAILED DESCRIPTION OF THE DRAWINGS

Referring more specifically to the drawings, FIG. 1 illustrates the longitudinal outside view of an embodiment of a personal mobile charging device. A typical view of the personal mobile charging device of an embodiment of the present invention—commonly referred to as the "device".

In use, typically, FIG. 1 and FIG. 2, the device has an elongate generally rectangular body. The device has flexible lengths of material defining outside surfaces (2) which define a top and bottom and an inside surface (4) typically of leather, woven material, fabric, elastomeric material, metal or similar material. The body has two relatively shorter sides, typically 1-2 inches wide, and two elongate sides, normally 28-60 inches long, to encircle a user's waist or carry a case or purse. The surfaces are fixed together such as by laminating them together, sewing or gluing, or any other suitable method to create an internal pocket or area to mount the thin flexible battery such as lithium polymer batteries (10) or battery (8). The battery (8) or batteries (10) may comprise one or more batteries arranged in a single layer. Alternatively, multiple batteries may be provided in a multiple layer arrangement. The inside surface of the device may have shielding (16) which protects the battery (8) or batteries (10) and the user.

The batteries (10) or battery (8) may be coupled in parallel to the protective circuit board (12) that has an integrated micro-usb charging plug (14) and battery charge indicator (20). The protective circuit board protects the battery (8) and/or batteries (10) from over-charging, under-charging and over-heating, and also controls the charge rate as well as discharge rate of the battery or batteries. The integrated battery charge indicator (20) allows the user to see the state of the batteries (10) or battery (8) at any time.

Once the batteries are mounted in the internal area or pocket of the device, the device may be permanently sewn (18) or laminated closed or closed n any other manner, effectively making it one piece.

Figure 4:
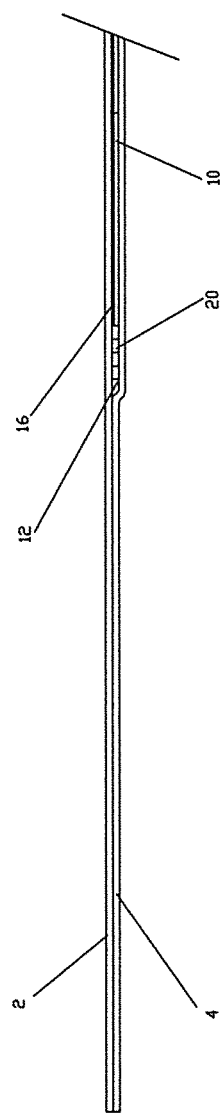
FIG. 4 shows a closer cut away view of the side of the device showing the inside and outside lamination lengths and the battery charge indicator, shielding and thin flexible batteries.

FIG. 3 and FIG. 4 show the device thin profile or side view with the outer surface (2) and the inner surface (4) sewn or laminated (18) together to create an inner area or pocket for the permanent placement or mounting of the batteries (10) or battery (8) inside the belt or straps interior area. The device may use buckles (6) or clips to secure end to end around a person's waist. The device has an integrated protective circuit board (12) to protect the user and the battery from overcharging and has an integrated battery charge indicator (20) in the edge or side of the device.

Accordingly, an embodiment of the present invention comprises and improved personal mobile charging device for use in providing standby power and/or backup charging for personal electronic devices in convenient, light weight and fashionable or utilitarian belt or strap. A thin flexible lithium polymer battery or batteries are located in the interior area of the device in a manner that allows the device to be used as the primary garment support and/or a carry strap for a purse or case. The improved personal mobile charging device uses the collective internal surface area of the belt/strap to maximize the overall charge capacity while maintaining a lightweight, useful and fashionable outside image. The device using the internal area for battery storage is perceived as a fashionable clothing or personal accessory while providing the user with standby power or back electrical charge at any moment and/or time.

The personal mobile charging device can be used full time to maintain a device's full electrical charge so that the device is ready for use at any time. In a preferred embodiment, the outside and inside surfaces of the device are manufactured of leather, plastic or other material that is strong, wear resistant and comfortable for the user. The battery or batteries are an ultra thin flexible and rechargeable lithium polymer normally 1-2 mm thick×25-30 mm wide×200-400 mm long, these batteries allow the device flexibility and a very compact overall size while providing excellent capacity. The improved personal mobile charging device typically utilizes 1 or 2 separate battery banks, each bank comprised of 1 to 20 individual batteries wired parallel to each other to increase capacity and durability.

The rectangular body defines flexible lengths which may comprise leather, woven material, fabric, elastomeric material, metal or similar material. The flexible lengths may comprise fashion accessory or a primary support for trousers or a garment, such as by way of non-limiting example, a belt or suspenders. Alternatively, the flexible lengths may define a belt or strap for a purse, case, backpack or other carried or slung bag, case or the like.

Although the description above contains many specificities, these should not be construed as limiting the scope of the invention but as merely providing illustrations of some of the preferred embodiments of the invention. For example, the batteries can be of some other type and shape than ultra thin lithium polymer. The outer surface or inner surface could be made of different materials, leather and/or an elastomeric material or the size and shape can be modified. The protective circuit board could be integrated into the battery design or the plug a different shape, size or location. Thus the scope of the invention should be determined by the appended claims and the legal equivalents rather than by the examples given.

What is claimed is:

1. In a mobile device, a thin flexible device acting as a personal mobile charging device comprising: an elongate rectangular body having a top, a bottom, two elongate sides and two short sides, namely, thin flexible lengths of material representing an outside and an inside surface or housing of the two elongate sides with a buckle or clip fixed at one end and a buckle attachment or clip on the opposing end of the length, the flexible lengths outside surface and inside surface are fixed together in a manner that creates a pocket or space for the permanent placement of at least one ultra-thin flexible rechargeable battery;

an integrated plug enabling the charging of the at least one battery and transfer of charge to a personal electronic device;

a protective circuit coupled with the at least one battery that protects the at least one battery from over or under charging and regulates charge to an attached personal electronic device; and a battery status indicator.

2. The improved personal mobile charging device of claim 1, wherein the flexible lengths are made of leather.

3. The improved personal mobile charging device of claim 1, wherein the flexible lengths are made of woven materials or fabric.

4. The improved personal mobile charging device of claim 1, wherein the flexible lengths are made of an elastomeric material.

5. The improved personal mobile charging device of claim 1, wherein the at least one battery comprises at least one flexible ultra thin lithium polymer battery.

6. The improved personal mobile charging device of claim 1, wherein the at least one battery comprises multiple batteries and are positioned in a single layer.

7. The improved personal mobile charging device of claim 1, wherein the at least one battery comprises multiple batteries and are positioned in a multiple layers.

8. The improved personal mobile charging device of claim 1, wherein the flexible lengths are made of metal.

9. The improved personal mobile charging device of claim 1, further comprising a shield to protect the batteries.

10. The improved personal mobile charging device of claim 1, wherein the device comprises a fashion accessory or a primary support for trousers or garments.

11. The improved personal mobile charging device of claim 1, wherein the device comprises a belt/strap for a purse, case, backpack, or other carried or slung bag, case, or tote.

* * * * *